Dec. 3, 1963

O. E. ANDRUS 3,113,080

CONTINUOUS DECONTAMINATION OF THE HYDROGEN ACQUIRING
SURFACE OF A PALLADIUM DIAPHRAGM USED
FOR THE TRANSFER OF ATOMIC HYDROGEN

Filed May 22, 1961

INVENTOR.
Orrin E. Andrus
BY
Andrus & Starke
Attorneys

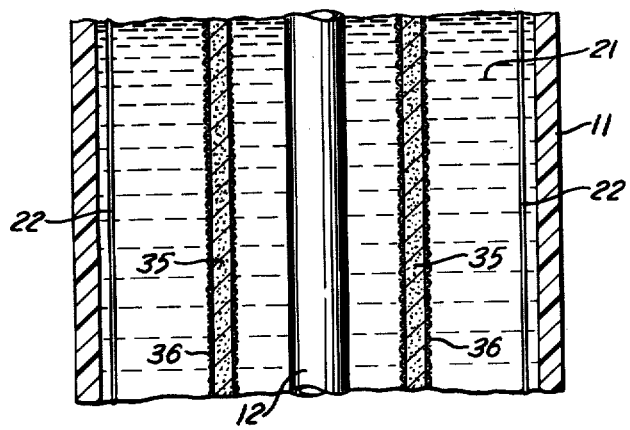
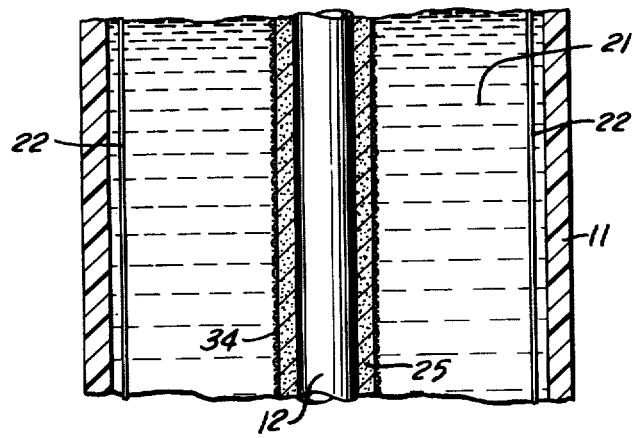

3,113,080
CONTINUOUS DECONTAMINATION OF THE HYDROGEN ACQUIRING SURFACE OF A PALLADIUM DIAPHRAGM USED FOR THE TRANSFER OF ATOMIC HYDROGEN
Orrin E. Andrus, Shorewood, Wis., assignor to A. O. Smith Corporation, Milwaukee, Wis., a corporation of New York
Filed May 22, 1961, Ser. No. 111,815
11 Claims. (Cl. 204—73)

This invention relates to a method of continuously decontaminating a hydrogen generating electrolytic cell.

The method of this invention acts to continuously protect the hydrogen acquiring surface of a metal-hydrogen transfer diaphragm against contamination so that atomic hydrogen may be acquired by the metal-hydrogen transfer diaphragm at the hydrogen acquiring surface and then released for chemical or electrochemical reaction on the opposite surface.

The invention utilizes as a cathode of a hydrogen generating electrolytic cell a porous deposit of a finely divided electrically-conductive material preferably disposed adjacent the hydrogen acquiring surface of a hydrogen-permeable hydrogen-bearing alloy-diaphragm to prevent or substantially retard a continuous buildup of contamination at the hydrogen acquiring surface and to thereby prevent or substantially retard a continuous decline in the rate of acquisition of atomic hydrogen by the hydrogen-metal alloy-diaphragm through its hydrogen acquiring surface.

The invention provides an electrolytic cell containing initially a palladium, palladium-alloy, or equivalent metal diaphragm in sheet or tubular form which will continuously acquire atomic hydrogen without reduction in the rate of acquisition due to the continuous deposition of contaminants on the hydrogen acquiring surface. This continuous acquisition can be brought about by carefully initially decontaminating the diaphragm, the anode, and the electrolyte of the electrolytic cell, depositing a finely divided porous layer of palladium black or equivalent material over the hydrogen acquiring surface of the diaphragm and making the exposed surface of this palladium black a cathode.

Palladium diaphragms, in the form of sheet or tubing, have been used in electrolytic cells to transport atomic hydrogen from a cathodic surface exposed to an acid electrolyte to the opposite surface at which the atomic hydrogen reacts with itself or with some other reactant to form a chemical compound or ion. Great difficulty has been experienced with such diaphragms due both to relatively low rates of hydrogen transfer and to rapidly declining rates of transfer.

A potential application for diaphragms formed by cathodically charging palladium or palladium alloys with hydrogen is the catalytic hydrogenation of atoms or molecules to form chemical compounds, such as the hydrogenation of organic material as taught by H. B. Wahlin in U.S. Patent 2,749,293. However, a serious difficulty encountered in the use of palladium diaphragms in electrolytic hydrogen transfer cells has been the low rate of hydrogen acquisition by palladium cathodes. S. Makereva (Journal of Physical Chemistry, U.S.S.R. 5:1380, 1934) observed the equivalent of four milliamperes per square centimeter of palladium diaphragm surface as the rate of hydrogen transfer through the palladium from a cathode surface when a reducible liquid was in contact with the palladium surface opposite the palladium cathode. N. Bienenfeld obtained a maximum equivalent transfer rate of 2.62 milliamperes per square centimeter when hydrogenating substances at the surface opposite the cathode (Ph.D. thesis, University of Wisconsin, 1954). He also witnessed a rapid decline to very low transfer rates.

The prior art failed to recognize the importance of properly treating the hydrogen acquiring surface of the hydrogen transfer diaphragm to prevent a decline in hydrogen transfer rates.

In experiments leading to the instant invention, comparable low initial transfer rates and rapid rates of decline were encountered (Ph.D thesis: Hydrogenation With Palladium Diaphragms, Orrin E. Andrus, University of Wisconsin, 1950). Further research led to the discovery that rates of hydrogen transfer input at the diaphragm cathode equivalent to at least 300 milliamperes per square centimeter could be obtained initially by carefully decontaminating the anode, the electrolyte and the surfaces of the palladium diaphragm in the electrolytic cell. However, the initial decontamination of the electrode surfaces and of the electrolyte did not prevent the decline of the rate of hydrogen acquisition. Although, it was determined that if the current density was relatively low, the rate of decline in hydrogen transfer through the diaphragm was rather rapid; whereas, if the current density was relatively high, the rate of decline in hydrogen transfer was lower.

It was discovered that a very thin deposit of material having poor hydrogen-transfer properties tended to form at the diaphragm cathode surface and that in a period of time hydrogen acquisition at the cathode surface nearly stopped. One possibility for the stoppage appeared to be a platinum deposit originating from platinum ions coming from the platinum anode in the electrolytic cell. This possibility was investigated after other sources of contamination appeared to be removed. The substitution of a palladium anode for a platinum anode in an electrolytic cell overcame the problem of a declining rate of absorption of hydrogen by the diaphragm cathode. Also, the use of a palladium anode resulted in a deposit of palladium black on the hydrogen acquiring surface of the palladium diaphragm and a depletion of the palladium anode.

To verify whether the success with the palladium anode was due to a deposit covering the hydrogen-acquiring surface of the palladium diaphragm or to the absence of a platinum ion source, a platinum anode was substituted for the palladium anode after a palladium-black deposit was electrolytically induced on the hydrogen-acquiring surface of the palladium diaphragm. It was discovered that no further contamination occurred even after many weeks of continuous operation. Furthermore, it was found that trace additions of contaminants to the charging cell electrolyte, such as calomel, and arsenic pentoxide showed far less tendency to contaminate the hydrogen acquiring surface of the palladium diaphragm when palladium black was present than when it was not present.

A theory advanced to explain the behavior of palladium black when it is deposited over the hydrogen acquiring surface of a palladium diaphragm in an electrolytic cell is that the exposed surface of the layer of electrically-conductive particles of palladium black acts as a cathode. Apparently the exposed surface of the palladium deposit acts as a cathode even though the deposit may not be in electrical contact with the diaphragm which is connected to the negative terminal of the power source. In case the palladium deposit is not in electrical contact with the palladium diaphragm, the deposit surface facing the cell anode acts as a cathode and the deposit surface facing the diaphragm acts as an anode. At a cathode, metals noble to hydrogen tend to plate out in preference to hydrogen from their respective ions. Because of this fact and because hydrogen ions are far more mobile and occur in far greater numbers than do contaminating cations in the electrolyte, the noble metals can be expected to remain attached to the cathodic surface of the palladium black deposit whereas the hydrogen can be expected to migrate by diffusion, adsorption, and electrochemical means so that the acquiring surface of the diaphragm receives a supply of hydrogen atoms with relatively few foreign atoms that might act to coat the palladium diaphragm surface with a film having poor diffusion characteristics. The following factors favor the longevity of continuous decontamination: a thick porous palladium-black deposit physically in contact with the entire hydrogen acquiring surface of the diaphragm, good electrical contact between the particles of palladium black and the palladium diaphragm, a relatively high current density at the cathode surface and a low rate of contamination entering the electrolyte.

The significance of the discovery of continuous decontamination can be grasped from the contrast in rates with and without such continuous decontamination. Until initial electrolytic decontamination was used, the rates of atomic hydrogen input were generally below an equivalent of about 10 milliamperes per square centimeter of palladium cathode surface. After initial electrolytic decontamination, the initial rate of atomic hydrogen input was as high as 300 milliamperes per square centimeter of palladium cathode surface. However, the rate of atomic hydrogen input tended to decline slowly even at a current density of 300 milliamperes per square centimeter. As the current density at the cathode was lowered, the rate at which the decline took place usually became greater. Not until continuous decontamination was discovered was the decline in atomic hydrogen input into the palladium metal at the cathodic surface halted. Thus, it became possible to increase the rate of hydrogen input a hundred fold over the rate previously obtained and to continuously employ this rate over long periods of time.

Various objects and advantages of the invention will hereinafter become more fully apparent from the following description of the drawings illustrating presently preferred embodiments thereof and wherein:

FIG. 4 is a partial-sectional view of a modified hydrogenation cell illustrating a palladium black support means; and FIG. 5 is a partial sectional view of a modified hydrogenation cell illustrating a palladium-black pad located out of contact with the hydrogen acquiring surface of a palladium diaphragm.

Figure 1:
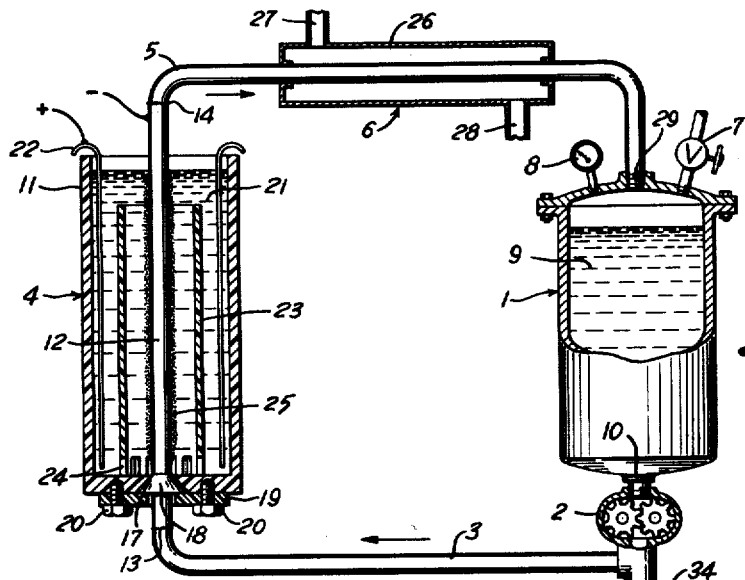
FIGURE 1 is a cross-sectional view of a hydrogenating apparatus.

FIGURE 1 illustrates a decontaminated apparatus for hydrogenating a substance such as corn oil by the batch method. The decontaminated apparatus, in general, comprises a reservoir 1 for the fluid which initially consists partially or wholly of reactants and finally partially or wholly of the hydrogenated product, a gear pump 2 to circulate the reactants, and conduit 3 which carries the fluid to the electrolytic cell 4 wherein hydrogenation occurs. Another conduit 5 carries the fluid from the cell to a heat exchanger 6 which acts to bring the fluid within the desired temperature range prior to its return to reservoir 1 for recycling. This is continued until hydrogenation to the degree desired is reached.

The reservoir 1 is provided with a valved inlet opening 7 through which a fluid charge may be introduced after proper purging or evacuation of the equipment to remove air and moisture. In order to control pressure in the system, a gage 8 is provided at the top of the reservoir. The reservoir is adapted to contain corn oil 9 or any other unsaturated animal or vegetable fat or oil. Other hydrogenable materials in either a liquid or gaseous phase may be processed by a similar apparatus. Located at the bottom of the reservoir 1 is an outlet 10 which is adjacent the gear pump 2. The pump 2 serves to establish a turbulent fluid flow within electrolytic cell 4.

The electrolytic cell 4 is provided with an outer generally cylindrical housing 11 which surrounds a palladium diaphragm 12 of conduit form. Conduit-shaped diaphragm 12 is welded at 13 to conduit 3 and at 14 to conduit 5. This makes possible the turbulent circulation of the corn oil 9 through the electrolytic cell 4. As may best be seen in FIG. 2, palladium diaphragm 12 has a hydrogen acquiring surface 15 and a hydrogen emitting surface 16.

The housing may be fabricated from an electrically non-conducting material such as plastic, glass or porcelain. The housing is open at the top to the atmosphere and has a funnel-shaped opening 17 in its bottom. Palladium diaphragm 12 is provided with a tight fitting tapered plastic ring 18 which complements funnel shaped opening 17. Housing 11 is seated on ring 18 and is drawn into liquid tight relation therewith by a ring 19 which bridges the joint between the housing and ring 18 and is bolted to the housing by studs 20.

The housing 11 is filled with an electrolyte 21, such as an aqueous solution of sulfuric acid. An anode 22 fabricated from a material such as platinum is placed in the electrolyte near the inner periphery of the housing. In order to prevent oxygen generated at the anode from coming in contact with diaphragm 12 in the cell 4, a porous sheath 23 fabricated from a ceramic, fabric or plastic material having a generally cylindrical configuration is positioned within the housing 11 and between the anode 22 and the conduit-shaped palladium diaphragm 12. The bottom portion of the sheath 23 is provided with a plurality of openings 24 to permit the electrolyte to freely circulate within the housing between the diaphragm 12 and the anode 22.

A porous layer of palladium black 25 is deposited directly on that portion of diaphragm 12 which is within the cell 4. The material deposited in a porous layer adjacent the acquiring surface 15 should be an electrically conductive material which remains essentially inert during the hydrogenation process. Materials such as platinum black, carbon, graphite and combinations thereof may be substituted for the palladium-black deposit 25. The material can be deposited directly on the hydrogen acquiring surface 15 in a finely divided form or it can be supported by a fabric ring so that it may be present in substantial thickness in close proximity to hydrogen acquiring surface 15.

From the electrolytic cell 4, conduit-shaped palladium diaphragm 12 carries the fluid to conduit 5 which extends through a conventional heat exchanger 6. The heat exchanger comprises a hollow cylindrical tube 26 which encloses a portion of the conduit 5. The tube 26 is provided with an inlet 27 to permit introduction of a heat exchange medium into the tube and an outlet 28 for discharge of the medium.

Conduit 5 terminates at opening 29 in the top of reservoir 1 and returns the partially or wholly hydrogenated corn oil 9 to the reservoir.

Figure 2:
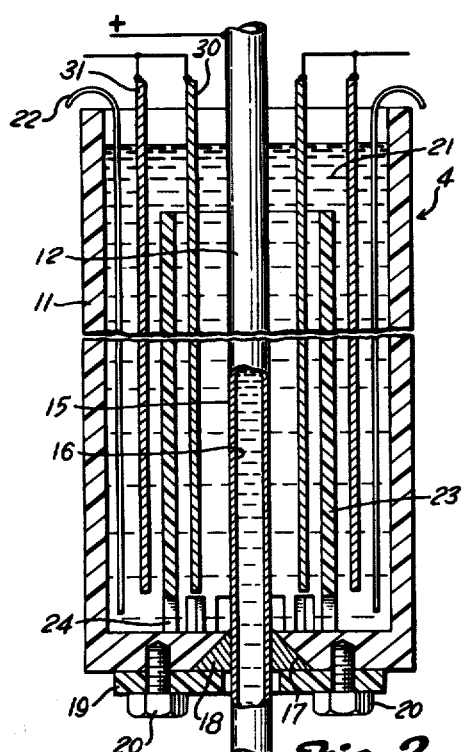
FIG. 2 is an enlarged cross-sectional view of the hydrogenation cell of FIGURE 1 illustrating an initial decontamination apparatus.
Figure 3:
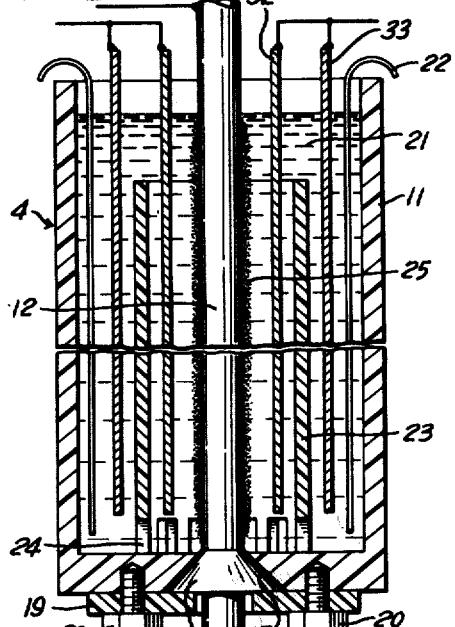
FIG. 3 is an enlarged cross-sectional view of the hydrogenation cell of FIGURE 2 illustrating an apparatus for depositing palladium black adjacent the hydrogen acquiring surface of a palladium diaphragm.

Before commencing the hydrogenation process, it is usually necessary to initially decontaminate the electrolytic cell 4 and particularly the surfaces of the anode 22, the hydrogen acquiring surface 15, and the electrolyte 21. Palladium black 25 is then deposited on the conduit-shaped palladium diaphragm 12 to provide a means for the continuous decontamination of the charging cell at the hydrogen-acquiring surface. FIGS. 2 and 3 illustrate a method for accomplishing initial decontamination and a method for depositing palladium black on diaphragm 12.

To initially decontaminate the cell, removable platinum cathodes 30 and 31 made of wire or sheet, are introduced into the electrolyte 21. In order to prevent accidental contacts of these platinum cathodes 30 and 31 with other metal surfaces within the cell, it sometimes is convenient to surround each platinum cathode with a porous sheath made of plastic, glass or asbestos sheeting, thread or fabric.

The operation of initially decontaminating the surface 15 of the conduit-shaped palladium diaphragm 12 as shown in FIG. 2, can be carried out by making the surface 15 anodic to the platinum cathodes 30 and 31 and establishing a current density of approximately 50 milliamperes per square centimeter at surface 15 of the diaphragm 12. The time necessary to remove various contaminating substances will vary depending on the type and degree of contamination present. As little as one hour of time has proven adeqaute under some conditions.

The second operation in the initial decontaminating procedure is that of removing contamination from the platinum anode 22 of the cell and of removing most of the undesired ions from the electrolyte 21. This operation is performed by making the platinum anode 22 anodic and maintaining the removable platinum cathodes 30 and 31 in the circuit. Again, the most suitable current density at the surface of the platinum anode 22 will depend on the type of contamination and the quantity present on the platinum anode 22 and in the electrolyte 21. A current density of 50 milliamperes per square centimeters and a total time of four hours has been adequate in most cases. While the potentials remain applied, the removable platinum cathodes 30 and 31 are gently removed. Before reuse, the removable platinum cathodes are dipped in concentrated nitric acid followed by heating in a flame to incandescence to decompose compounds and to oxidize deposits. The acid dip and heating operations are repeated until the contamination appears to be removed.

The final preparation, before operation of the unit for hydrogenation, is that of introducing palladium black directly onto the hydrogen-acquiring surface 15 of the diaphragm 12. This may be done as shown in FIG. 3 by introducing palladium anodes 32 and 33 into the cell. In some cases, it is advantageous to protect the surface of the latter with a porous sheath such as plastic, glass or asebstos, sheeting, thread or fabric to prevent accidental electrical contact with other metal surfaces within the cell. The palladium diaphragm 12 is then made cathodic by applying a current density of 100 milliamperes per square centimeter to the palladium anodes 32 and 33 until the desired film of palladium black 25 develops over the cathode surface. Once this film of palladium black 25 is formed, the removable palladium anodes 32 and 33 are removed from the cell.

Palladium black may also be introduced into the electrolytic cell without subjecting the diaphragm 12 to an excessive hydrogen charge. This may be accomplished without making diaphragm 12 cathodic. The platinum electrode 22, in this instance, is made cathodic by applying a current density of 100 milliamperes per square centimeter to the palladium anodes 32 and 33 for four to eight hours. Some of the palladium black thus formed will be transferred to the surface 15 and some will remain in the cell. The palladium electrodes 32 and 33 may then be removed from the cell. Actuation of the cell to commence the usual hydrogen charging of diaphragm 12 will usually result in the transfer and deposit of a portion of the palladium black present in the cell to the hydrogen acquiring surface 15.

It may be desirable in some instances to support a relatively thick deposit of palladium black in contact with hydrogen acquiring surface 15 of diaphragm 12. As may best be seen in FIG. 4, this may be accomplished by surrounding and supporting deposit 25 on surface 15 with a substantially inert tube made of glass or plastic fabric 34. This tubular support acts to permit utilization of thicker palladium-black deposits and also aids in assuring good electrical contact of the deposit 25 with diaphragm 12. Any substantially inert fabric in tube, sheet or tape form may be employed as a support. The palladium black may be introduced between the tubular support and the conduit 12 as a thick slurry previously prepared.

In some applications it may be desirable to support a palladium-black deposit out of electrical contact with the hydrogen-acquiring surface 15. This may be done in the manner shown in FIG. 5. A thick pad of palladium black 35 is enclosed on both sides and supported by inner tubes 36 made of glass or plastic fibers. The enclosed pad of palladium black 35 is conveniently of cylindrical shape and is positioned around tubular-shaped diaphragm 12 in the electrolytic cell 4 although out of physical and electrical contact therewith. The cylindrical pad of palladium 35 is supported by the base of housing 11 and extends above the surface of the electrolyte 21. The cylindrical pad of palladium black serves as a cathode on the outside surface and as an anode on the inside surface. Thus hydrogen and noble metals are electrochemically deposited on the exterior surface. The hydrogen transfers through the porous deposit of palladium black in the pad by adsorption and electrochemical action. At the inner surface of the cylindrical pad the anodic action converts the hydrogen and contacting water to hydrogen ions. Again at the cathodic surface 15 of the palladium diaphragm 12, hydrogen ions are converted to hydrogen and water. This hydrogen alloys with the palladium of diaphragm 12. Since the contaminating metals were removed at the cathode surface of the porous palladium pad, the palladium cathode surface 15 remains essentially free from contamination.

The cell, following the introduction of palladium black, can be placed in operation in hydrogenating fluid reactants that are being circulated at high velocity through the palladium diaphragm 12. It has been found possible to employ current densities from 0 to 300 milliamperes per square centimeter continuously for weeks at a time without any appreciable sign of decline in hydrogen transfer rates due to contamination.

The hydrogenation process is generally carried out as a batch process at a temperature that will allow ready circulation of the hydrogenated product. In operating the decontaminated system as a batch process at temperatures in the range of room temperature to 220° F., the corn oil 9 is initially drawn from reservoir 1 and forced through conduit 3 by the action of gear pump 2 and into the electrolytic cell 4. It is preferable with respect to the instant invention that a sufficient fluid velocity be established and maintained to cause a turbulent fluid flow within the interior of the tubular-shaped diaphragm 12. The palladium black 25, deposited in contact with the hydrogen-acquiring surface 15, is made cathodic and acts as the hydrogen-adsorbing surface. The sulfuric acid electrolyte 21 which penetrates the palladium black within the cell supplies the cathode surface with positively charged hydrogen ions. It is believed that atomic hydrogen is generated at the cathodically charged palladium-black surface 25 by the discharge of the hydrogen ions and that the atomic hydrogen is then adsorbed by the finely divided porous deposit. Apparently, the atomic hydrogen is then transferred by adsorptive and electrochemical means to the hydrogen-acquiring surface 15 of the tubular-shaped palladium diaphragm 12 through which it readily diffuses to the emitting surface 16. The highly-reactive atomic-hydrogen-charged palladium diaphragm 12 is brought into intimate contact with the corn oil 9 on the emitting or consuming surface 16 of the diaphragm by turbulent liquid flow. The palladium content of diaphragm 12 at the emitting surface 16 acts catalytically to induce a reaction of the corn oil 9 with diffused atomic hydrogen to partially or wholly hydrogenate the oil. The oil 9 which is continuously being forced through the tubular-shaped diaphragm 12 during hydrogenation passes into the conventional heat exchanger 6 to remove the heat of hydrogenation so that the most favorable temperature range may be maintained. The partially or wholly hydrogenated corn oil is then returned to reservoir 1 and is again circulated through the system. This recirculation is continued until the desired degree of hydrogenation has been achieved. Upon completion of the batch hydrogenation process, the oil 9 may be discharged by opening outlet valve 37.

This process affords a method whereby substantial volumes of atomic hydrogen may be continuously absorbed by a hydrogen-permeable alloy diaphragm at relatively rapid rates over extended periods of time. Prior attempts to accomplish this have proven unsuccessful as the metal-hydrogen alloy diaphragm would become contaminated and the hydrogen-transfer rates would dwindle until hydrogen nearly ceased to diffuse therethrough. Continuous decontamination depends on the presence of palladium black 25 or an equivalent porous deposit or pad of electrically conductive particles arranged to serve as a cathode on which contamination will deposit in preference to deposition on the hydrogen-acquiring surface 15 of the palladium diaphragm 12. This deposit allows the contaminants to be deposited on particles which can transfer hydrogen by mechanisms other than by diffusion. Very high concentrations of atomic hydrogen can be introduced into a palladium diaphragm through a palladium-black deposit.

Should contamination recur in sufficient amounts to cause a decline in hydrogen transfer rates through the diaphragm 12, it can be readily removed by repeating the decontaminating steps outlined above.

Various modes of carrying out the invention are contemplated as being within the scope of the following claims particularly pointing out and distinctly claiming the subject matter which is regarded as the invention.

I claim:

1. A method of continuously supplying hydrogen to the hydrogen acquiring surface of a fluid impermeable electrically conductive hydrogen transmitting alloy diaphragm in an electrolytic cell having an electrolyte and an anode and continuously diffusing hydrogen through the diaphragm to the hydrogen emitting surface thereof comprising, providing a porous layer of an electrically conductive material selected from the group consisting of palladium black, platinum black, carbon, graphite and combinations thereof adjacent the hydrogen acquiring surface of the diaphragm and in electrical contact therewith, and constituting a surface of the porous electrically conductive layer a cathode whereby impurities and hydrogen become deposited on the cathode surface of the porous layer by electrochemical means and the hydrogen is transferred through the porous layer and to the hydrogen acquiring surface of the diaphragm where the hydrogen may be transmitted through the diaphragm and discharged at the emitting surface thereof to react with a hydrogenable material brought into contact therewith.

2. A method of continuously supplying hydrogen to the hydrogen acquiring surface of a fluid impermeable electrically conductive hydrogen transmitting alloy diaphragm in an electrolytic cell having an acidic electrolyte and an anode comprising, disposing a porous layer of an electrically conductive material adjacent the hydrogen acquiring surface of the diaphragm and in electrical contact therewith, and constituting a surface of the porous electrically conductive layer as a cathode whereby impurities and hydrogen become deposited on the cathode surface of the pourous layer by electrochemical means and the hydrogen is transferred through the porous layer and to the hydrogen acquiring surface of the diaphragm at a substantially continuous rate.

3. A hydrogenation apparatus comprising, a first container provided with an opening, the first container being fabricated from an insulating material, a second container disposed in the opening of the first container, at least a portion of the second container consisting of an electrically conductive hydrogen transmitting hydrogen-metal alloy, one of the containers being provided with an anode, an electrolyte disposed in the container containing the anode, a porous electrically conductive cathode fabricated from a material selected from the group consisting of palladium black, platinum black, carbon, graphite, and combinations thereof disposed on the surface of the second container in electrical contact therewith and in contact with the electrolyte, whereby a current flow may be established in the electrolyte between the anode and the cathode and atomic hydrogen may be evolved at the cathodically charged surface and transmitted to and through the hydrogen-metal alloy portion of said second container.

4. The hydrogenation apparatus of claim 3 wherein the chamber is provided with means for turbulently circulating a hydrogenable material through the chamber to thereby subject the hydrogenable material to hydrogen being discharged from the hydrogen emitting surface.

5. A hydrogenation apparatus comprising, a first container provided with an opening, a second container disposed in the opening of the first container, the second container being fabricated from palladium, the first container being provided with an anode, an acidic electrolyte disposed in the first container and in contact with the anode and the second container, a cathode cosisting of a layer of a porous electrically conductive material disposed across the ion path in the electrolyte between the anode and the second container, and means to support the porous layer in the electrolyte whereby a current flow may be established in the electrolyte between the anode and the cathode and hydrogen may be evolved at the cathodically charged surface and may be transmitted to and through the palladium container.

6. The hydrogen apparatus of claim 5 wherein a porous non-conducting sheath is disposed between the anode and the cathode layer to direct anodically generated oxygen away from the hydrogen being generated at the cathode surface.

7. In a method of continuously supplying hydrogen in an electrolytic cell to an electrically conductive hydrogen transmitting alloy diaphragm having a hydrogen acquiring surface in the electrolytic cell and a hydrogen emitting surface opposite the acquiring surface the steps of disposing an electrolyte adjacent the hydrogen acquiring surface in the electrolytic cell making the hydrogen acquiring surface an anode, disposing an electrode in contact with the electrolyte, making the electrode a cathode, establishing a current flow in the electrolyte between the anode and the cathode to decontaminate the hydrogen acquiring surface, withdrawing the electrode from contact with the electrolyte, providing a porous electrically conductive material adjacent the hydrogen acquiring surface and in contact with the electrolyte, and making the porous conductive material a cathode whereby hydrogen may be evolved at the cathode surface of the electrolytic cell and may be transmitted to the hydrogen acquiring surface and through the alloy diaphragm and may be discharged at the emitting surface.

8. In a method of continuously supplying hydrogen in an electrolytic cell to an electrically conductive hydrogen transmitting alloy diaphragm having a hydrogen acquiring surface in the electrolytic cell and a hydrogen emitting surface opposite the acquiring surface, the steps of disposing an electrolyte adjacent the hydrogen acquiring surface in the electrolytic cell, disposing first and second electrodes in contact with the electrolyte, making the first electrode an anode, making the second electrode a cathode, establishing a current flow in the electrolyte between the anode and the cathode to decontaminate the first electrode and the electrolyte, withdrawing the second electrode from contact with the electrolyte, providing a porous electrically conductive material adjacent the hydrogen acquiring surface and in contact with the electrolyte, and making the porous conductive material a cathode whereby hydrogen may be evolved at the cathode surface of the electrolytic cell and may be transmitted to the hydrogen acquiring surface and through the alloy diaphragm and may be discharged at the emitting surface.

9. In a method of continuously supplying hydrogen in an electrolytic cell to an electrically conductive hydrogen transmitting alloy diaphragm having a hydrogen acquiring surface in the electrolytic cell and a hydrogen emitting surface opposite the acquiring surface, the steps of disposing an electrolyte in contact with the hydrogen acquiring surface, disposing a palladium member in contact with the electrolyte, making the member an anode, making the hydrogen acquiring surface a cathode, establishing a current flow in the electrolyte between the anode and the cathode to thereby establish a porous electrically conductive deposit of palladium in electrical contact with the hydrogen acquiring surface and in contact with the electrolyte, making the porous deposit a cathode to permit cathodic evolution of hydrogen at the cathode and adsorption of the evolved hydrogen by the deposit and electrolytic transfer of the hydrogen to the hydrogen acquiring surface whereby the hydrogen may be diffused through the alloy diaphragm.

10. In a method of continuously supplying hydrogen in an electrolytic cell having an electrolyte and a first electrode to an electrically conducitve hydrogen transmitting alloy diaphragm having a hydrogen acquiring surface and a hydrogen emitting surface, the steps of making the hydrogen acquiring surface an anode, making the first electrode a cathode, establishing a current flow in the electrolytic cell between the anode and the cathode to decontaminate the hydrogen acquiring surface, disposing a second electrode in the electrolytic cell, making the second electrode an anode, establishing a current flow in the electrolytic cell between the anode and the cathode to decontaminate the second electrode and the electrolyte, withdrawing the cathode from the electrolytic cell, depositing a porous electrically conductive material adjacent the hydrogen acquiring surface and in contact with the electrolyte, and constituting the porous conductive deposit a cathode to permit adsorption of hydrogen by the deposit and electrolytic transfer of the hydrogen to the hydrogen acquiring surface whereby hydrogen may be diffused through the alloy diaphragm.

11. In the method of continuously hydrogenating a hydrogenable material including continuously supplying atomic hydrogen to the hydrogen acquiring surface of a fluid impermeable electrically conductive hydrogen transmitting palladium-alloy diaphragm in an electrolytic cell having an anode and an electrolyte and continuously diffusing atomic hydrogen through the diaphragm and to the hydrogenating surface thereof, the improvement comprising disposing a porous layer of palladium adjacent the hydrogen transmitting diaphragm and between the hydrogen generating surface and the anode and establishing a surface of the palladium layer as a cathode whereby impurities and hydrogen ions become deposited on the cathode surface of the porous layer by electrochemical means and the hydrogen in atomic form is transferred through the porous layer and to the hydrogen acquiring surface of the palladium alloy diaphragm where the atomic hydrogen may be transmitted through the diaphragm and discharged at the emitting surface thereof to react with a hydrogenable material brought into contact therewith.

References Cited in the file of this patent

UNITED STATES PATENTS

| | | |
|---|---|---|
| 2,228,264 | Freedley | Jan. 14, 1941 |
| 2,241,585 | Day | May 13, 1941 |
| 2,749,293 | Wahlin | June 5, 1956 |
| 2,903,402 | Fromm | Sept. 8, 1959 |

FOREIGN PATENTS

| | | |
|---|---|---|
| 797,565 | Great Britain | July 2, 1958 |

UNITED STATES PATENT OFFICE
CERTIFICATE OF CORRECTION

Patent No. 3,113,080                          December 3, 1963

Orrin E. Andrus

It is hereby certified that error appears in the above numbered patent requiring correction and that the said Letters Patent should read as corrected below.

Column 8, line 36, for "hydrogen" read -- hydrogenation --; line 67, for "electrolyte" read -- electrolytic --; column 10, line 1, for "deposiing" read -- depositing --.

Signed and sealed this 21st day of July 1964.

(SEAL)

Attest:

ESTON G. JOHNSON
Attesting Officer

EDWARD J. BRENNER
Commissioner of Patents